United States Patent [19]

Shakkottai et al.

[11] Patent Number: 4,979,820

[45] Date of Patent: Dec. 25, 1990

[54] APPARATUS FOR THE REMOTE DETECTION OF SOUNDS CAUSED BY LEAKS

[76] Inventors: Parthasarathy Shakkottai, 2622 Gardi St., Duarte, Calif. 91010; Vijayaraghavan Alwar, 1065 East Wapello St., Altadena, Calif. 91001

[21] Appl. No.: 341,840

[22] Filed: Apr. 24, 1989

[51] Int. Cl.$^5$ .......................................... G01M 3/24
[52] U.S. Cl. ................................ 356/129; 73/40.5 A; 73/592; 73/655; 381/172
[58] Field of Search ...................... 356/129, 361, 362; 381/172; 73/40.5 A, 592, 655

[56] References Cited

U.S. PATENT DOCUMENTS

| | | | |
|---|---|---|---|
| 1,709,762 | 4/1929 | Zworykin | 381/172 |
| 3,028,450 | 4/1962 | Manning | 179/1 |
| 3,168,824 | 2/1965 | Florer | 73/40.5 |
| 3,209,344 | 9/1965 | Miller | 340/239 |
| 3,831,561 | 8/1974 | Yamamoto | 122/379 |
| 4,139,291 | 2/1979 | Parthasarathy | 356/129 |
| 4,309,576 | 1/1982 | Corrigan | 179/110 A |
| 4,452,071 | 6/1984 | Eesley et al. | 356/361 |
| 4,498,333 | 2/1985 | Parthasarathy | 73/40.5 A |

OTHER PUBLICATIONS

Critical Review of Acoustic and Acoustic Emission Leak Detection Systems 2nd Epri Incipient-Failure Detection Conf.: Proceedings; McAnally(Ed); Report Epri-CS-4748: Conf.-8410452; Oct. 86 (Abstract Only).

New Acoustic Techniques for Leak Detection in Fossil Fuel Plant Components, Report CISE-2005, 1982; Parini, G & Possa, G. (Abstract Only).

Primary Examiner—Richard A. Rosenberger

[57] ABSTRACT

Two laser beams derived from a laser pass through a furnace and are superposed in a laser spot to produce interference fringes having the same pitch as that of a Ronchi grating printed on a retroreflecting screen. Minute fluctuations of the laser beams caused by sound waves from leaks result in intensity fluctuations of the laser spot when the laser fringes move past the fixed grating. A telescope and photocell arrangement detects the light variations to produce an electrical signal which is amplified and filtered to detect the sound of leaks. This non-contact laser Schlieren microphone is sensitive to sounds all along the path of the beams.

11 Claims, 1 Drawing Sheet

DETAIL OF LASER SPOT

RETROREFLECTOR

APPARATUS FOR THE REMOTE DETECTION OF SOUNDS CAUSED BY LEAKS

ACKNOWLEDGEMENT

This invention was made with Government support under contract No. DE-A105-CE40684 awarded by NASA. The Government has certain rights in this invention.

BACKGROUND OF THE INVENTION

1. Field of the Invention:

The invention is directed towards a system of non-contact detection of acoustic airborne noise caused by water or steam leaks in boilers, etc.

2. Description of the Prior Art:

Steam or water leaks in recovery boilers are dangerous. In other types of boilers such as fossil fuel boilers, the leaks may not be dangerous, but may be expensive to fix if not detected early. Generally, two methods of detection have been developed, one based on detection of airborne sounds by suitable microphones, and the other based on the detection of ultrasonic waves by piezoelectric transducers in contact with the walls of pipes carrying water. Microphones are delicate and suffer from corrosion problems in the harsh environments of such boilers even when provided with cooling.

Diaphragmless microphones with carbon granules as the sensing element have been proposed by the applicant as a low cost, rugged device for use in harsh environments as described in the U.S. Pat. No. 4, 498,333. However, an even more promising device, the laser Schlieren microphone, can be produced to satisfy the need for a sensor that detects the sounds of leaks.

U.S. Pat. Nos. 3,028,450 to Manning, 3,168,824 to Florer, et al., 3,209,344 to Miller, 3,831,561 to Yamamato, et al. and 4,309,576 to Corrigan disclose detection systems for water or gas leaks. The patent to Yamamato is specifically directed to detection of leaks in recovery boilers. None of these patents discloses or suggests the use of a laser Schlieren microphone.

OBJECTS AND SUMMARY OF THE INVENTION

It is an object to the present invention to provide a sound detection device, immune to heat and corrosion. It is another object to provide such a device for detecting airborne sounds of leaks in boiler tubes. Still another object is to provide a reliable, low cost device of high sensitivity suitable for use in hostile environments such as recovery boilers.

These and other objects are achieved by using a laser beam, split into two beams by a beam splitter, which are aimed towards a retroreflecting screen on which a Ronchi grating is printed. The two beams interfere producing fringes which are adjusted to have the same pitch as that of the printed grating. Minute fluctuations of the displacement of the laser beams are caused by sound waves due to refraction (the Schlieren effect). The motion of the laser spot across the grating produces variations of light intensity which are detected by a telescope and photocell arrangement at the transmitting end. The arrangement is sensitive enough to pick up ordinary speech sounds.

The advantage of this system for use in recovery boilers is that the laser microphone senses sound all along the length of the laser beams. The laser and retroreflector are located outside the boiler and the method is non-contact.

Ordinary helium-neon lasers, which produce red light, are adequate for this application even though infrared lasers could be used in sooty environments to take advantage of their greater penetrating power.

BRIEF DESCRIPTION OF THE DRAWING

The present invention will be described with reference to the accompanying drawing, wherein.

DESCRIPTION OF THE PREFERRED EMBODIMENTS

The following description is of the best presently contemplated mode of carrying out the invention. This description is made for the purpose of illustrating general principles of the invention, and is not to be taken in the limiting sense. The scope of the invention is best determined by the appended claims.

Figure 1:
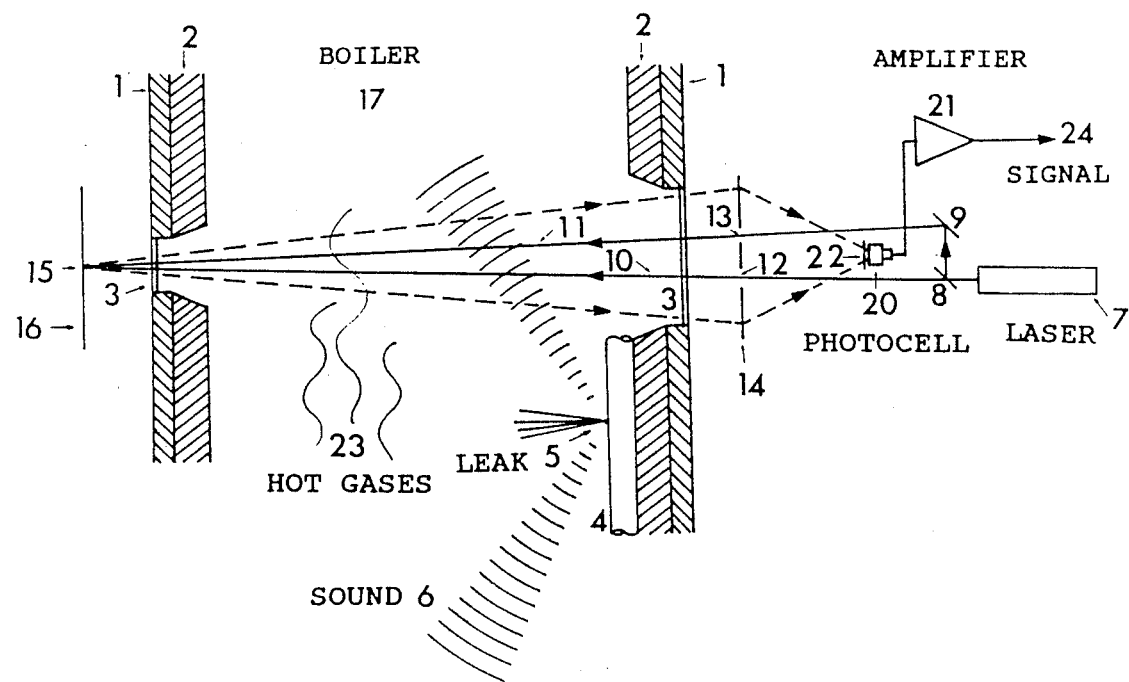
FIG. 1 is a sectional view of a portion of a recovery boiler showing the laser and receiver on one side and the retroreflector on the other side, both outside the boiler.

Referring to FIG. 1, a recovery boiler 17 includes walls 1 with linings 2 and observation windows 3. A steam or water tube 4 located inside the boiler may develop a small leak 5. The pressurized fluid exiting from the leak 5 emits sound waves 6 whose peak frequencies range from about 10 kHz for a 1 mm leak down to 2 kHz for 5 mm leaks. In addition to the noise from leaks, there is a low frequency background noise due to combustion which is to be discriminated against.

A laser 7, typically a continuous wave gas laser, such as the helium-neon laser, produces a laser beam 10 split at a beam splitter 8, which produces another beam 11 upon reflection from a mirror 9. The laser beams 10 and 11 pass through small holes or slots 12 and 13 drilled through a plastic Fresnel lens 14 of diameter approximately equal to 10 cm, used to gather the light reflected from the retroreflection screen 16.

Figure 2:
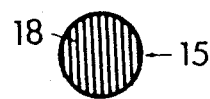
FIG. 2 is a detail of the laser spot on the retroreflector showing the interference fringes.

In FIG. 2, the two beams overlap at the laser spot 15 producing interference fringes 18. The laser spot 15 is formed on the retroreflecting screen 16 located outside the boiler 17.

Figure 3:
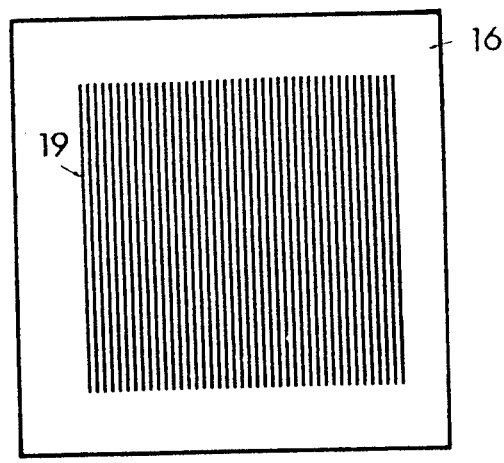
FIG. 3 shows the retroreflector with the Ronchi grating printed thereon.

In FIG. 3, a Ronchi grating 19 of the same pitch as the interference fringes 18 is printed on the retroreflecting screen 16 such as "Scotchlite." Referring again to FIG. 1, for typical recovery boilers, the laser beams 10 and 11 are of the order of 10 m long and the spot 15 is approximately 1 cm in diameter. The pitch of the Ronchi grating 19 is typically thirty lines per centimeter. Whenever the sound waves 6 from the leak 5 pass through the laser beams 10 and 11, the beams fluctuate because of density changes caused by sound waves which in turn causes changes of refraction. When the fringe pattern 18 of FIG. 2, moves over the printed grating 19 of FIG. 3, changes in the intensity of the spot 15 are produced. This light is focused by the Fresnel lens 14 onto a photocell 20 and the electrical signal is amplified by amplifier 21 and is used for detection of leaks and for producing useful alarm signals. A narrow band filter 22 covers the photocell 20 allowing the laser light to enter freely but cuts off other ambient light.

The laser system has a wide frequency response, typically from 0 to 100 kHz, which must be restricted by filtering unwanted frequencies for the present application. A pass band from 2 kHz to 10 kHz is adequate for leak detection. The low frequency noise of the boiler and the low frequency beam displacements caused by the density changes due to hot gases 23 moving past the laser beams 10 and 11 are filtered out from the output signal 24.

The pitch of the interference fringes may be adjusted to match the fixed pitch of the grating 19 by varying the distance between the beam splitter 8 and mirror 9. This is done by having mirror 9 mounted on a micrometer slide.

The embodiments of the invention in which an exclusive property or privilege is claimed are defined as follows:

1. A sound sensitive, single ended, laser Schlieren system useful for detecting leaks in recovery boilers or like devices comprising:
    a source of light which is a laser whose light is split into two beams by the use of beam splitting means and totally reflecting means;
    said totally reflecting means taking the form of a small mirror or right angled prism;
    said beams recombining at a spot producing interference fringes of suitable pitch, after passing undisturbed through holes or slots in a telescope arrangement;
    a retroreflecting target incorporating a printed Ronchi grating of uniformly spaced lines of fixed pitch;
    means for adjusting said pitch of said fringes to be equal to the pitch of said Ronchi grating by varying the distance between said beam splitting means and said totally reflecting means;
    said telescope arrangement to gather light reflected from said retroreflector;
    a photocell to convert fluctuations of light incident on said photocell to an electrical signal;
    and means to amplify, filter, and otherwise process said signal to infer the presence of leaks and set alarms.

2. A laser Schlieren system as in claim 1 wherein said light source is a laser which produces continuous waves of visible or infrared light.

3. A system as in claim 2 wherein the laser is chosen to be a helium-neon laser for the visible case and for the infrared case, a laser diode.

4. A system as in claim 3 wherein the beam lengths are on the order of 10 meters for large boilers.

5. A system as in claim 1 wherein said spot is of the order of 1 cm in diameter.

6. A system as in claim 1 where the number of fringes in said spot is of the order of 30.

7. A system as in claim 1 where said telescope arrangement uses an inexpensive Fresnel lens of diameter of the order of 10 cm for large light gathering power.

8. A system as in claim 7 wherein said holes or slots in said Fresnel lens, needed to pass said laser beams without refraction, are of the order of 5 mm diameter or width, respectively.

9. A system as in claim 1 where said retroreflective target is made of "Scotchlite," and has superposed on it a grating of lines on the order of 30 per cm.

10. A system as in claim 9 wherein said target is large enough to allow easy capture of said laser spot, and has the approximate dimensions, 10 cm by 10 cm.

11. A system as in claim 1 wherein all optical components, said laser, and said amplifier are assembled in a compact enclosure for convenience in mounting and handling.

* * * * *